United States Patent [19]

Sargent et al.

[11] Patent Number: 5,616,151
[45] Date of Patent: Apr. 1, 1997

[54] METHOD FOR ADJUSTING PH IN TEXTILE PROCESSING SOLUTIONS WITH UREA HYDROCHLORIDE SALT

[75] Inventors: R. Richard Sargent, Rome; Jeffrey R. Alender, Marietta, both of Ga.

[73] Assignee: Peach State Labs, Inc., Rome, Ga.

[21] Appl. No.: 419,854

[22] Filed: Apr. 11, 1995

Related U.S. Application Data

[60] Continuation of Ser. No. 90,797, Jul. 12, 1993, abandoned, which is a division of Ser. No. 919,523, Jul. 24, 1992, Pat. No. 5,234,466.

[51] Int. Cl.⁶ .............................. D06P 1/00; D06M 13/435
[52] U.S. Cl. ........................ 8/636; 8/634; 252/8.61; 252/8.62; 252/8.63; 252/8.81; 252/8.83; 252/8.84; 252/8.91
[58] Field of Search ........................ 8/494, 585, 634, 8/DIG. 21; 252/8.6, 8.61, 8.81, 8.83, 8.84, 8.91, 8.62, 8.63

[56] References Cited

U.S. PATENT DOCUMENTS

| | | | |
|---|---|---|---|
| 3,912,681 | 10/1975 | Dickson | 8/137 |
| 3,936,316 | 2/1976 | Gulla | 134/3 |
| 3,953,352 | 4/1976 | Mizutani et al. | 252/142 |
| 3,958,061 | 5/1976 | Singer et al. | 428/276 |
| 3,988,108 | 10/1976 | Segoshi et al. | 8/8 R |
| 4,056,354 | 11/1977 | Pittman et al. | 8/611 |
| 4,058,498 | 11/1977 | Bonnet | 252/8.8 |
| 4,087,360 | 5/1978 | Faust et al. | 210/58 |
| 4,129,416 | 12/1978 | Bennett et al. | 8/115 |
| 4,164,477 | 8/1979 | Whitley | 252/99 |
| 4,285,690 | 8/1981 | North | 8/186 |
| 4,285,738 | 8/1981 | Ogata | 134/26 |
| 4,300,898 | 11/1981 | North | 8/185 |
| 4,345,063 | 8/1982 | North | 528/245 |
| 4,350,494 | 9/1982 | Scheidegger et al. | 8/636 |
| 4,382,799 | 5/1983 | Davis et al. | 8/107 |
| 4,402,852 | 9/1983 | Young | 252/182 |
| 4,404,116 | 9/1983 | Young | 252/182 |
| 4,448,841 | 5/1984 | Glass et al. | 428/270 |
| 4,466,893 | 8/1984 | Dill | 252/8.55 |
| 4,472,283 | 9/1984 | Brooks | 210/698 |
| 4,555,348 | 11/1985 | Moran | 8/532 |
| 4,673,522 | 6/1987 | Young | 252/87 |
| 4,692,314 | 9/1987 | Etani | 422/265 |
| 4,756,888 | 7/1988 | Gallup et al. | 423/42 |
| 4,830,766 | 5/1989 | Gallup et al. | 252/8.522 |
| 4,882,202 | 11/1989 | Holtzman et al. | 427/98 |
| 4,894,169 | 1/1990 | Delitsky | 210/698 |
| 4,906,384 | 3/1990 | Hamilton | 210/697 |
| 5,124,438 | 6/1992 | Brueckmann et al. | 8/563 |
| 5,223,179 | 6/1993 | Connor et al. | 252/548 |
| 5,234,466 | 8/1993 | Sargent et al. | 8/585 |
| 5,308,401 | 5/1994 | Geke et al. | 134/2 |
| 5,380,518 | 1/1995 | Roozdar | 423/477 |
| 5,427,748 | 6/1995 | Wiedrich et al. | 422/264 |

FOREIGN PATENT DOCUMENTS

| | | |
|---|---|---|
| 37811 | 2/1986 | Hungary . |
| WO94/02549 | 2/1994 | WIPO . |

*Primary Examiner*—Paul Lieberman
*Assistant Examiner*—Caroline L. Dusheck
*Attorney, Agent, or Firm*—Bruce D. Gray; Kilpatrick & Cody

[57] ABSTRACT

A method for the adjustment of pH in textile processing solutions that includes the use of urea sulfate or other strong acid in the presence of a weak base.

8 Claims, No Drawings

5,616,151

METHOD FOR ADJUSTING PH IN TEXTILE PROCESSING SOLUTIONS WITH UREA HYDROCHLORIDE SALT

This continuation of application Ser. No. 08/090,797 filed Jul. 12, 1993 now abandoned which is a divisional of application Ser. No. 07/919,523 filed on Jul. 24, 1992, now U.S. Pat. No. 5,234,466.

BACKGROUND OF THE INVENTION

This application is in the area of methods for the adjustment of pH in textile processes.

Fibers are processed in a number of ways before incorporation into textile products such as fabric and carpet. In a typical procedure in the case of nylon, nylon chip is first extruded and then converted into either continuous filament or staple fiber. The filament or staple fiber is then spun into yarn, and twisted and heat set as desired. The undyed, untreated yarn can be dyed and finished before or after fabrication into a final product.

The dying procedure can occur by batch or continuous operation. Again, in the case of nylon, in either operation, the dye bath typically includes an acid dye (i.e., a dye that adheres to the nylon under acidic conditions), a chelating agent, an acid dye leveler (an agent that promotes the even absorption of dye by the yarn), a wetting agent, and a pH adjuster (to insure acidic pH). The dye bath for continuous processing is typically maintained at a pH of between 3 and 6.5, and more typically, between 4 and 5. The dye bath for exhaust application is typically maintained at a pH of between 6 and 7, and more typically at pH 6.5. The dyed yarn is then taken through a fixing step (usually moist heat), and rinsed.

The dyed yarn is finished by the application of desired finishing chemicals to the yarn, including stain blocking agents, fluorochemicals, fabric softeners, stabilizers, UV absorbers, optical brighteners, sewing assist agents, antistatic agents, waterproofing agents, durable resins, starches, and sizes. Some of these agents adhere more effectively when applied under acidic conditions. For example, common commercial stain blocking chemicals such as BASF Stain Protector and DuPont Stain resist chemicals are usually more effective when applied at a pH of between 1.9 and 2.5. Fluorochemical polymeric finishes are usually applied at a pH of between 4 and 5. Coapplication of a stain blocking agent and a fluorochemical in a foam is often carried out at a pH of 3–5.

Yarns and fibers made from materials other than nylon can also be dyed or treated under acidic conditions. Wool and silk are typically acid dyed. Polyester is often disperse dyed with a solution that may have an acidic pH.

Traditional chemicals used for pH adjustment in textile processing include sulfamic acid, formic acid, sulfuric acid, phosphoric acid and combinations thereof. These pH adjusters can exhibit one or a combination of low efficiency (i.e., require large amounts of chemical for the desired effect), high cost, difficulty in handling, hazards in handling, corrosiveness, or high acidity of the resulting effluent stream.

One of the most commonly used pH adjustment system used in carpet processing is sulfamic acid $((HO)S(O)_2NH_2)$. Lower pHs can be attained with sulfamic acid than with comparable amounts of formic acid. Sulfuric and phosphoric acids will lower pH more efficiently than either sulfamic or formic acids. Corrosivity tests performed on carbon steel and stainless steel coupons show that all of these acids can be harmful to metal equipment.

Sulfamic acid is a solid that can be dissolved in water up to a concentration of about 15% at room temperature. Dissolving the acid is cumbersome and represents an additional step in the textile manufacturing processes while creating another quality control step.

Since sulfamic acid is only soluble in water to an extent of about 15% by weight at room temperature, and is usually used in a 13% solids solution, it is not a very efficient pH adjustment system. Approximately 6–grams/liter of 13% sulfamic acid solution is required to lower the pH of a typical stain resist application bath to a pH of 2, depending on the concentration and type of stain blocking chemical used.

While sulfamic acid is weaker than sulfuric acid, sulfamic acid powder can cause burns and thus requires special procedures for handling. Sulfamic acid solution is also quite corrosive, and thus has a damaging effect on machinery, structural supports and concrete. Sulfamic acid solution even corrodes 316 stainless steel coupons and carbon steel.

The use of sulfamic acid increases the cost of textile processes because of the time and expense incurred to dissolve the powder, and the cost involved to repair and maintain corroded equipment. Further, as a significant amount of the acid used is carried into the effluent stream, the effluent must be neutralized to a significant extent with caustic prior to discharge to the water treatment facility, further adding to the cost of the textile process.

The object of the present invention is to provide a method for pH adjustment in textile processing that includes the utilization of a chemical that is more convenient, less corrosive, more efficient and less harmful to the environment than the currently used processes.

SUMMARY OF THE INVENTION

In one embodiment, the invention as disclosed is a method for adjusting pH during textile processing that includes the addition of urea sulfate to the aqueous textile processing solution. Urea sulfate can be formed with any desired ratio of urea and sulfuric acid that performs the desired function. Examples of suitable salts include those formed by combining between 1:4 and 4:1 moles of urea with sulfuric acid, more usually between 2.5 and 0.25 moles of urea with one mole of sulfuric acid, or between 2.0 and 0.5 moles of urea to sulfuric acid. A preferred ratio is approximately 1 mole of sulfuric acid to one mole of urea, or alternatively, a slight molar excess of urea.

The use of urea sulfate to adjust pH in textile processing solutions has advantages over conventional methods of pH adjustment in textile processing. Urea sulfate is less corrosive to metal equipment and other contact surfaces when heated than the equivalent amount of sulfamic acid. Further, urea sulfate may decompose under heat or catalytic conditions (including acidic pH) to carbon dioxide and ammonium sulfate. These decomposition products have a decreased tendency to lower the pH Of effluent streams, and are less corrosive than traditional chemicals used for pH adjustment in textile processing.

In an alternative embodiment, the invention includes the use of a salt formed from a strong acid and a weak base as the pH adjusting agent. Preferred salts are those that, like urea sulfate, efficiently lower the pH of textile processing baths but exhibit less corrosivity when heated than the strong acid alone, and therefore, are less harmful to persons and equipment with which it is in contact.

Urea sulfate, as well as the equivalent strong acid/weak base salts disclosed herein, can be used in any process that sulfamic acid or like acids have traditionally been used in, including but not limited to sulfation, metal cleaning, scale removal, manufacture of dyes and pigments for the removal of excessive nitrite from diazotization reactions, in paper manufacturing by reducing pulp degradation in the bleaching stages of electroplating, and as a catalyst in urea-formaldehyde resin manufacturing. Urea sulfate can also replace traditional acids for solvation, in aqueous cleaning solutions, and in processing solutions not related to textile processing. Materials that can be cleaned include metals, jewelry, printed circuit boards, wood, masonry, mortar, concrete, painted surfaces, plastics, polymeric substances, and the like.

DETAILED DESCRIPTION OF THE INVENTION

The term alkyl, as used herein, unless otherwise specified, refers to a saturated straight, branched, or cyclic hydrocarbon of $C_1$ to $C_{10}$.

The term lower alkyl, as used herein, and unless otherwise specified, refers to a $C_1$ to $C_{10}$ saturated straight, branched, or cyclic (in the case of $C_{5-6}$) hydrocarbon, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The term aryl, as used herein, refers to phenyl and substituted phenyl, wherein the substituent is alkyl, halo (chloro, bromo, iodo, or chloro), hydroxy, sulfonyl, carboxylic acid, nitro, or a combination of these, and wherein the aromatic ring can have up to three substituents.

The term textile processing solution as used herein refers to any aqueous solution that is used during the processing of fiber, yarn, or textile products, including carpets, carpet tile, and fabric, to treat the fiber, yarn, or textile product to improve its properties. Nonlimiting examples of textile processing solutions include dyebath solutions and finishing solutions, including those that apply stain blocking chemicals to the fiber, yarn, or textile product. The fiber, yarn, or textile product can be prepared from any material, including nylon (polyamide), wool, silk, polyester, acrylics, modacrylics, polyolefins, and cellulosics, including rayon.

The term stain blocking agent, as used herein, refers to a chemical that imparts stain resistance to the fiber, yarn, or product. Nonlimiting examples of chemicals that impart stain resistance to nylon fibers are described in U.S. Pat. No. 4,501,591 to Ucci, et al., U.S. Pat. Nos. 4,592,940 and 4,680,212 to Blythe, et al., U.S. Pat. No. 4,780,099 to Greschler, et al., U.S. Pat. No. 4,822,373 to Olson et al., European Patent Application 87301180.3 by E.I. Du Pont Nemours & Co., U.S. Pat. No. 4,937,123 to Chang et al., and U.S. Pat. No. 4,940,757 and U.S. Pat. No. 5,061,763 to Moss, et al..

The term polyamine, as used herein, refers to a monomer or polymer that has more than one —$NH_2$, —NH(alkyl), —N(alkyl)$_2$, —NH(hydroxyalkyl), —N(hydroxyalkyl)$_2$, —NH(aryl), or —N(aryl)$_2$ attached to the monomer or polymer.

The invention as disclosed is a method to adjust pH in textile processing solutions that includes the use of urea sulfate or its equivalent in the processing solution. In particular, urea sulfate can be added to textile dye baths and to finishing solutions to adjust pH in a manner that is often less harmful to the equipment that it is in contact with than traditional pH adjusters used in textile processing.

It is known that urea decomposes when heated or under certain catalytic conditions to ammonia and $CO_2$. Although not confirmed, it is hypothesized that the application of heat to a processing solution that includes urea sulfate results in the decomposition of the salt to carbon dioxide and the ammonium salt of sulfuric acid (urea sulfate). This decomposition process may result in an effluent that is less acidic, and thus less hazardous to the environment, than effluent containing traditional pH adjusters.

Since effluent resulting from textile processing that utilizes urea sulfate as the pH adjuster may have a higher pH than comparable effluent from textile processing activities using traditional pH adjusters, the effluent requires less neutralization before discharge to the waste water treatment system.

Urea sulfate can also replace traditional acids for solvation, in aqueous cleaning solutions, and in processing solutions not related to textile processing. Materials that can be cleaned include metals, jewelry, printed circuit boards, wood, masonry, mortar, concrete, painted surfaces, plastics, polymeric substances, and the like.

Preparation of Urea Sulfate

Urea is weakly basic, forming salts with strong acids. Urea sulfate is a salt formed from the simple mixture of urea with sulfuric acid. Common urea sulfate salts include the 1:1 urea to sulfuric acid salt (CAS 21351-39-3), and the 2:1 urea to sulfuric acid salt (CAS 17103-31-0). The 2:1 urea sulfuric acid salt is sold by Aldrich Chemical Company. Any desired ratio of urea to sulfuric acid that performs the desired function in a textile processing solution can be prepared by simply mixing the appropriate ratios of components, typically in water. The mixing of urea with sulfuric acid typically results in an exotherm that should be handled with care.

The preferred composition is a solution of sulfuric acid and urea combined in a 1:1 molar ratio or a slight excess of urea, in water. This composition results in a sulfuric acid urea salt solution that has the pH reduction ability of sulfuric acid when used, for example, to reduce the pH of stain resist application baths, but is less corrosive than sulfuric acid or sulfamic acid. It is easy to handle and much safer to handle than either sulfuric or sulfamic acid solutions.

Any amount of urea sulfate can be used, with any molar ratio of urea and sulfuric acid, that performs the desired function. Given the disclosure herein, one of ordinary skill in the art can easily manipulate the ratio of urea and sulfuric acid, and the amount of salt used, to obtain a desired pH. Methods to determine pH are well known to those of skill in the art.

EXAMPLE 1

Preparation of Urea Sulfuric acid 1:1 Salt.

Prilled urea (17.5 grams, 0.29 moles) was dissolved in 53.5 grams water. To this solution was slowly added sulfuric acid (29.0 grams, 0.26 moles, 89.3%) at 66° C. The temperature was maintained below 50° C. in a cooling bath during the addition. The final solution on titration with 0.5 N NaOH (phenolphthalein indicator) was 5.3 N, which is equal to the theoretical value.

EXAMPLE 2

Comparison of Efficiency of Product of Example 1 and Sulfamic Acid in Adjusting pH The product of Example 1 (44.5% solids, 26% sulfuric acid solution), as well as a 13% solids solution of 1:1 urea sulfate was compared to a 13% solids solution of sulfamic acid in tap water for ability to decrease pH. The results are provided in Table 1. As indicated, a 13% solids solution of sulfamic acid was approximately equal to a 13% solids solution of urea sulfate in ability to reduce pH. However, the 44.5% solids solution of urea sulfate was significantly more efficient at lowering pH than the 13% sulfamic acid solution. Since 15% is the practical concentration limit of sulfamic acid in water, its efficiency as a pH adjuster cannot be significantly increased by increasing its concentration.

TABLE 1

| GRAMS acid/liter | 13% solids Sulfamic | 13% solids Urea Sulfate | 44.5% solids Urea Sulfate |
| --- | --- | --- | --- |
| 0 | 7.6 | 7.6 | 7.6 |
| 1 | 3.2 | 3.0 | 2.4 |
| 3 | 2.4 | 2.3 | 1.9 |
| 5 | 2.1 | 2.1 | 1.7 |
| 6 | 2.0 | 2.0 | 1.7 |

EXAMPLE 3

Comparison of Corrosivity of Product of Example 1 and Sulfamic Acid

The corrosivity on 316 stainless steel coupons of a 13% solids solution of sulfamic acid and a 13% solids solution of urea sulfate was compared by immersion of the coupon in the two solutions for 96 hours at 90°–100° C. The results are provided in Table 2. As indicated, a 13% urea sulfate solution is less corrosive to 316 stainless steel than a comparable solution by weight of 13% sulfamic acid.

TABLE 2

|  | Sulfamic Acid (13%) | Urea Sulfate (13%) |
| --- | --- | --- |
| Weight of coupon, initial | 23.00 | 22.55 |
| Weight of coupon, final | 22.67 | 22.48 |
| Weight loss | 0.33 | 0.07 |
| % weight loss | 1.43 | 0.31 |

Strong Acid Weak Base Salts As Equivalents to Urea Sulfate

Chemicals other than urea sulfate that can be used to adjust pH in textile processing include salts formed by the combination of a strong acid with a weak base. Examples of strong acids include mineral acids such as phosphoric, alkylphosphoric, arylphosphoric, sulfuric, alkylsulfuric, arylsulfuric, nitric, hydrochloric, hydrobromic, and others. Some acids commonly considered "weak" acids are also suitable. These include acids such as sulfamic, methylsulfamic, carboxylic acids such as formic, acetic, propionic, acrylic, methacrylic, benzoic, and citric; dicarboxylic acids such as oxalic, maleic, glutaric, and malonic; styrene sulfonic acid, phosphonoformic, phosphonoacetic, carbamic, carbonic, sulfonic, alkyl sulfonic acid, aryl sulfonic acid (specifically including xylene sulfonic acid, toluene sulfonic acid, benzene sulfonic acid, cumene sulfonic acid, dodecylbenzene sulfonic acid, dodecyl diphenyloxide disulfonic acid, naphthalene sulfonic acid, benzaldehyde sulfonic acid, methylnaphthalene sulfonic acid, trimethylbenzenesulfonic acid, aminobenzene sulfonic acid, halobenzenesulfonic acid, alkoxybenzenesulfonic acid, benzophenone sulfonic acid, benzophenone disulfonic acid, halonaphthalene sulfonic acid, alkylnaphthalene sulfonic acid, alkoxynaphthalene sulfonic acid, carboxybenzene sulfonic acid (3-sulfobenzoic acid), hydroxybenzenesulfonic acid, hydroxynapthalenesulfonic acid, carboxymethylbenzene sulfonic acid, alkylbenzene disulfonic acid, dicarboxybenzene sulfonic acid, acetamidobenzene sulfonic acid, acetaminonaphthalene sulfonic acid, naphthalene disulfonic acid, alkyl naphthalene disulfonic acid, dialkylbenzene disulfonic acid, biphenyl-4, 4'-disulfonic acid, benzene and naphthalene sulfonic acids that contain combinations of halo, alkyl, hydroxy, carboxy, alkoxy, and acetamino groups, and sulfonated dihydroxydiphenylsulfone), methanesulfonic, methylenediphosphonic acid, boric, thiocyanic, and others. Examples of weak bases include urea, acetylurea, guanidine, hydroxyurea, semicarbazide; mono-, di-, or tri(alkyl or, aryl)urea, and wherein in the case of di(alkyl or aryl)urea the alkyl or aryl groups can be on the same or different nitrogen atoms; mono-, di- or trialkyl or hydroxyalkyl amine, specifically including mono-, di- and triethanolamine, 0-methyl hydroxyl amine (methoxylamine), and polyamines, including (mono or di)alkylaminoalkylacrylate, and (mono or di)alkylaminoalkylmethacrylate, and polymers or copolymers made from these monomers.

Examples of salts include any salt that is formed by the combination of one of the acids listed above with one of the bases listed above, in any desired molar ratio. The examples specifically include the mono-, di-, or triethanolamine salts of sulfuric acid, the mono-, di-, or triethanolamine salts of phosphoric acid, urea phosphate, salts of aryl sulfonic acids and urea with mono-, di-, or triethanolamine, guanidine carbonate, guanidine hydrochloride, guanidine nitrate, the salt of urea with sulfamic acid, and guanidine sulfate.

Any molar ratio of strong acid to weak base that serves the desired pH adjusting or other purpose can be used within the scope of this invention. Typical ratios, in terms of acid or base equivalents, are typically between approximately 4 to 1 and 1 to 4 acid:base equivalent units or a slight excess of base, in equivalence units. As with the urea sulfate, a 1:1 ratio by equivalent units is preferred, or slight excess of base.

EXAMPLE 4

Preparation of Sulfuric Acid (Tri and Di)-ethanolamine Salt

A sulfuric acid (tri and di)-ethanolamine salt useful for pH adjustment in textile processing was prepared by dissolving 41.8 g of an 85/15 mixture by weight of triethanolamine and diethanolamine in 28 grams of water, and then adding 30.2 grams of 89.3% sulfuric acid. The final solids content of the product was 48.9% by weight (28% sulfuric acid).

Use of Urea Sulfate or its Equivalent in Textile Processing

The following examples are nonlimiting examples of procedures for adjusting pH in nylon dying and finishing activities. Given these examples, anyone of skill in the appropriate art can use the method disclosed herein to adjust the pH in processing solutions that include fibers or yarn other than nylon, for example silk, wool, rayon, other cellulosics, polyester, cotton, acrylics, and modacrylics, and at a variety of pHs.

It is recommended that the desired salt, as opposed to the individual components, be added to the textile processing solution, to avoid a dilution effect, as well as corrosivity and safety problems associated with addition of the strong acid in the uncomplexed form.

Urea sulfate or its above-described equivalents, can be easily used as the pH adjusting agent for textile processing applied with any equipment, including but not limited to a Kuster's Flui-con foam applicator, pad applicator, exhaust dye beck, Kuster's flood applicator, continuous roller screen, silk screen applicators, overflow pans, kiss rollers, Kusters flexnips, pressure dye becks, tanning wheels for leather, and Kuster's Fluidyer. Urea sulfate or its above-described equivalents, may be less corrosive to this equipment than the traditional chemicals used for pH adjustment.

EXAMPLE 5

Dyebath Formula for Continuously Dyed Nylon Carpet

Table 3 provides a formula for an acid dyebath solution for continuously dyed nylon yarn that has been incorporated into carpet. The pH of this dye solution is approximately 4.5.

TABLE 3

| | |
|---|---|
| as necessary | Tectilon Dyes (Ciba-Giegy Dyestuff Corp.) |
| 0.25 grams/liter | Chelating agent (tetrasodium ETDA) |
| 0.50 grams/liter | Dowfax 2A1 (anionic acid dye leveling agent) |
| 0.50 grams/liter | DOSS (Dioctyl sulfosuccinate wetting agent) |
| 0.25 grams/liter | Product of Example 1 |

EXAMPLE 6

Stain Blocking Aftertreat Bath Solution for Nylon Carpets Applied with a Kusters "Flui-con" Foam Applicator using BASF Stain Protector Table 4 provides a formulation for a finishing solution for nylon carpet for the application of BASF Stain Protector using a Kusters "Flui-con" foam applicator.

TABLE 4

| | |
|---|---|
| 30.0 grams/liter | BASF Stain Protector (Stain blocking agent) |
| 2.5 grams/liter | Product of Example 1 |
| 7.0 grams/liter | Peach State Labs KAF 260 (foaming agent) |

The pH of this finishing solution is approximately 2.5.

EXAMPLE 7

Stain Blocking Aftertreat Bath Solution for Nylon Carpets Applied with a Kusters Flui-con Foam Applicator using DuPont StainMaster Table 5 provides a formulation for a finishing solution for nylon fiber or yarn for the application of DuPont stain resist agent with a Kusters Flui-con foam applicator.

TABLE 5

| | |
|---|---|
| 30.0 grams/liter | SR-200 (Dupont Stainmaster stain blocking agent for nylon fiber) |
| 5.0 grams/liter | Product of Example 1 |
| 7.0 grams/liter | PS Labs KAF 260 (foaming agent) |

The pH of this solution is approximately 2.5.

Modifications and variations of the present invention relating to methods to adjust the pH in textile processing solutions will be obvious to those skilled in the art from the foregoing detailed description of the invention. Such modifications and variations are intended to come within the scope of the appended claims.

We claim:

1. A method for lowering pH in a textile dyebath comprising:
    adding to the textile dyebath a pH lowering effective amount of urea hydrochloride salt, having an equivalents ratio of urea to hydrochloric acid between 1:4 and 4:1.

2. The method of claim 1, wherein the urea hydrochloride is formed from a molar ratio of urea to hydrochloric acid of between 2.5 and 0.25 moles of urea to 1 mole of hydrochloric acid.

3. The method of claim 1, wherein the urea hydrochloride is formed from an approximate 1:1 molar ratio of urea to hydrochloric acid.

4. The method of claim 1, wherein the textile dyebath is a nylon dyebath.

5. A method for lowering pH in a textile finishing solution comprising adding to the textile finishing solution a pH lowering effective amount of urea hydrochloride salt, having an equivalents ratio of urea to hydrochloric acid between 1:4 and 4:1, wherein the finishing solution contains at least one finishing chemical selected from the group consisting of stain blocking agents, fluorochemicals, fabric softeners, stabilizers, UV absorbers, optical brighteners, sewing assist agents, antistatic agents, waterproofing agents, durable resins, starches, and sizes.

6. The method of claim 5 wherein the equivalents ratio of urea to hydrochloric acid is between 2.5:1 and 25:1.

7. The method of claim 5 wherein the equivalents ratio of urea to hydrochloric acid is approximately 1:1.

8. The method of claim 5 wherein the textile finishing solution is a nylon treatment bath.

* * * * *